March 24, 1931.                    R. F. HALL                    1,797,657
                                   AIRPLANE
                          Filed July 20, 1928            2 Sheets-Sheet 1
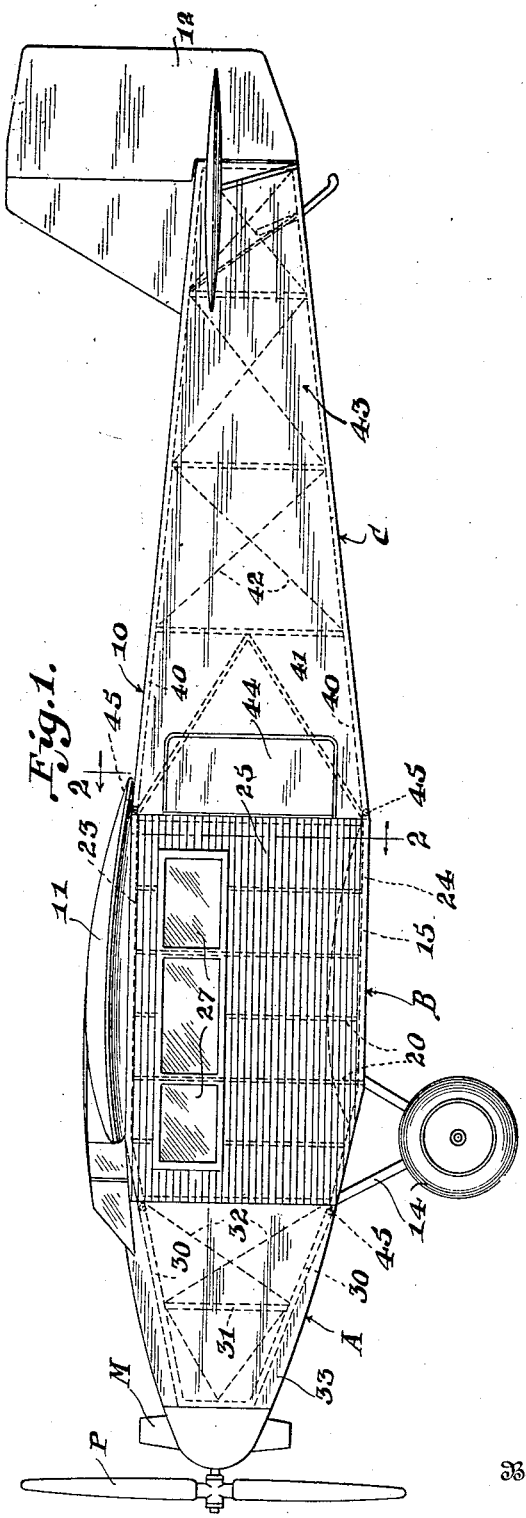
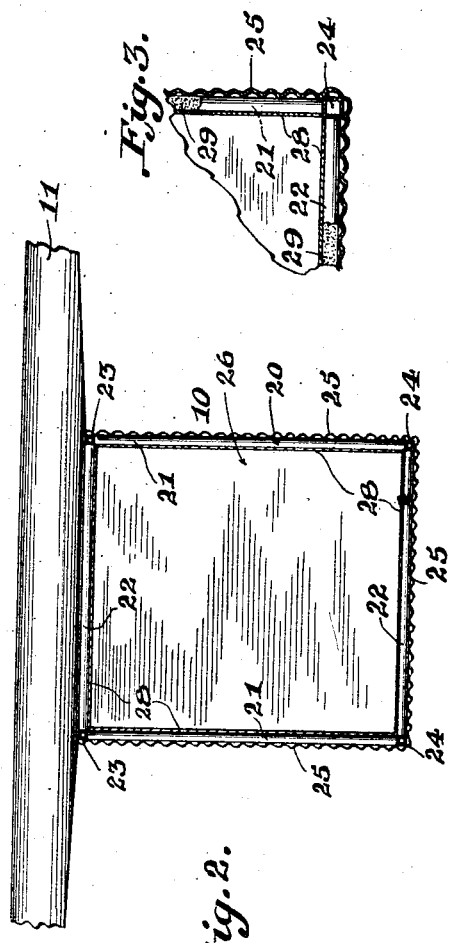
Inventor
Randolph F. Hall
By
Attorney March 24, 1931.  R. F. HALL  1,797,657
AIRPLANE
Filed July 20, 1928   2 Sheets-Sheet 2
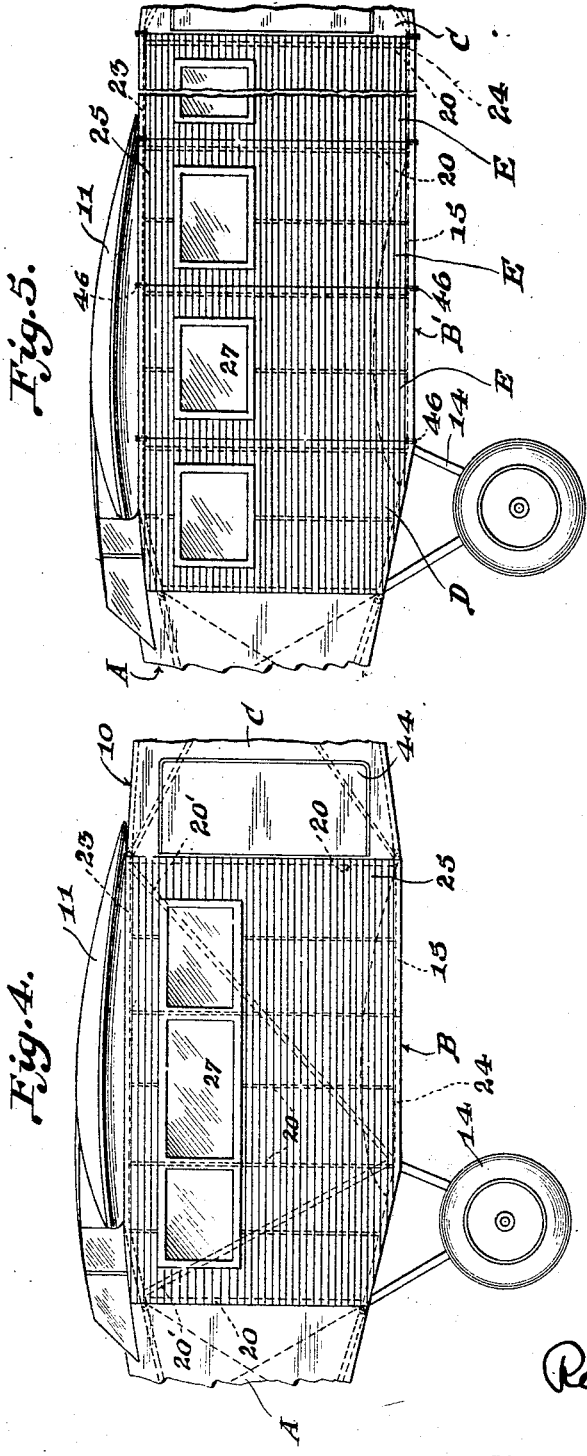
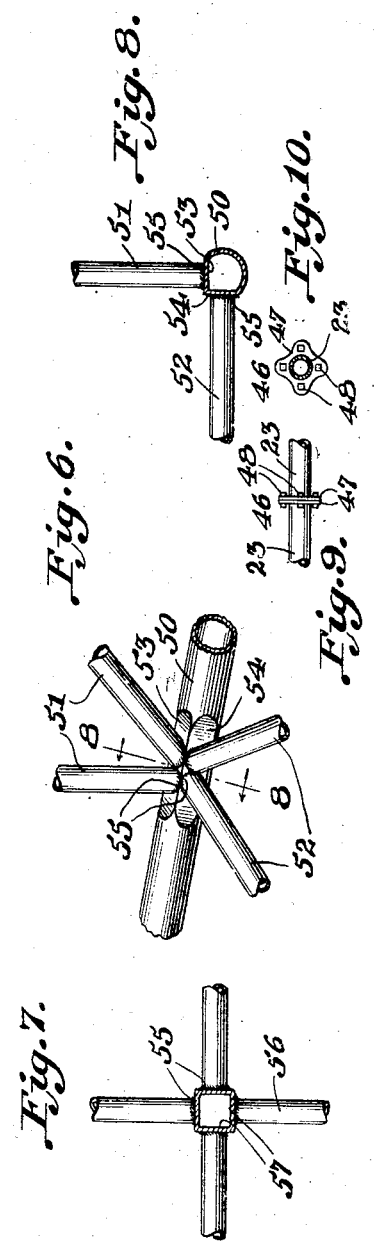
Inventor
Randolph F. Hall
By Albert ...
Attorney Patented Mar. 24, 1931

1,797,657

UNITED STATES PATENT OFFICE

RANDOLPH F. HALL, OF ITHACA, NEW YORK, ASSIGNOR TO CUNNINGHAM-HALL AIRCRAFT CORPORATION, OF ROCHESTER, NEW YORK, A CORPORATION OF NEW YORK

AIRPLANE

Application filed July 20, 1928. Serial No. 294,163.

This invention relates to certain improvements in airplanes; and the nature and objects of the invention will be readily understood by those skilled in the arts to which it pertains, in the light of the following detailed description and explanation of the accompanying drawings illustrating what I now believe to be the preferred embodiments or mechanical and aerodynamical expressions of the invention from among various other forms, arrangements, combinations and constructions of which the invention is capable within the spirit and scope thereof.

The invention is concerned generally with and adapted for embodiment in aircraft bodies, hulls, and such like elements; but is more especially and specifically directed to airplane bodies or fuselages of the so-called cabin or enclosed types, although not restricted to such types, as the invention is also applicable to bodies or fuselages of the open or cockpit types, and to bodies combining the enclosed or cabin and the open or cockpit types.

A general object of the invention resides in the provision of such improvements in the design, arrangement and construction of such general types of aircraft bodies as to eliminate certain material difficulties and disadvantages heretofore encountered with such bodies, and to obtain important advantages therefor, both from the standpoint of construction, assembly and production, and from the standpoint of the operation and use of such bodies under actual operating or service and flight conditions.

Among the material and important advantages and results which the invention obtains through its arrangement, design, and construction of air craft bodies of the types referred to, are:

An interiorly unobstructed cabin or useful load section to afford the maximum of unobstructed space therewithin without sacrificing structural strength.

Both fire and crash protection for the occupants and contents of the cabin or useful load section, primarily provided by the design and construction of such section itself without the necessity of additional structure.

A wall construction and arrangement which presents adequate retaining surface for cargo; which lends itself to insulation against noise, drafts or wind leakage, and temperature; and which permits of substantially unobstructed installation of doors and windows, and further permits of the efficient use of sliding, drop, and the like types of windows.

Durability, absorption of vibration, and the elimination of concentrated forces in the highly stressed portion of the body or fuselage.

A design and construction which is capable of ready, rapid production at relatively low costs, through the structural simplification and facility of assembly of the construction employed, and which is peculiarly adapted to embodiment in metal.

Standardization of the cabin sections by forming the same in units for detachable or permanent assembly to provide such a section of the desired length and capacity for the body or fuselage of which the section forms a part.

A further feature and object of the invention resides in the provision of an improved frame joint and method of forming the same, particularly applicable to the joining of tube truss members to tubular members.

With the foregoing general objects and results in view, as well as certain others which will appear from the following explanation, the invention consists in certain novel features in design, and in construction and combination of elements, as will be more fully and particularly referred to and specified hereinafter.

Referring to the accompanying drawings:

Fig. 1, is a side elevation of an airplane having a body or fuselage of the cabin or enclosed type embodying the invention.

Fig. 2, is a transverse, vertical section through the cabin section of the fuselage of Fig. 1, taken on the line 2—2, the upper wing of the airplane being more or less diagrammatically indicated in position extending across the cabin section.

Fig. 3, is a detail fragmentary sectional and enlarged view of a lower corner portion of the fuselage cabin section, showing a joint of the invention formed between the longérons and transverse formers with the metal skin in attached position.

Fig. 4, is a view in side elevation of a cabin section of a slightly modified type of construction.

Fig. 5, is a view in side elevation showing the cabin section formed of standardized units detachably assembled and joined to form the complete section.

Fig. 6, is a perspective view showing a joint of and formed in accordance with the method of, the invention, as applied to and forming a part of the frame of the fuselage cabin section.

Fig. 7, is a view of another form of frame joint.

Fig. 8, is a sectional view taken on the line 8—8 of Fig. 6.

Fig. 9, is a detail view in side elevation of a form of detachable coupling for connecting the cabin section units of Fig. 5.

Fig. 10, is a view in end elevation of the coupling of Fig. 9, a portion of the frame member or longéron being shown in transverse section.

The design and construction of aircraft bodies, fuselages, hulls, and such like aircraft elements, follow either of two general types of construction, namely, the monocoque or semi-monocoque type of construction, and what may be aptly termed as the "trussed" type of construction. In the monocoque type of construction, and wherever the term "monocoque" is used herein or in the appended claims it is to include and cover "semi-monocoque" types of construction and this application and the claims are to be so read and interpreted, the body, or similar element, embodies formers, frames or the like, with a skin or covering secured thereon, which skin or covering forms a part of the load or stress carrying structure and lends and adds strength thereto. In the "trussed" type of construction, a trussed frame or structure is provided to which a skin or covering is secured solely for the purpose of covering or enclosing such trussed structure, and which skin does not carry or receive any of the load or stresses and does not add strength to the structure. Each type presents certain advantages from construction, assembly and use standpoint, and in accordance with the principles and features of the present invention, both types of construction are employed in a single body or similar element, so as to benefit from the advantages of both while reducing the objections and disadvantages which such constructions inherently possess.

The several features of the invention are illustrated in the accompanying drawings and described herewith, as applied to and embodied in a body or fuselage of the enclosed or cabin type, particularly adapted for use with and as an element of airplanes of the so-called commercial or transport types, but the illustrated examples are not intended to limit the invention to either such types of airplanes or to such types of bodies, as the features in design, arrangement and construction are of general application to bodies, fuselages, hulls, and similar elements, not only of airplanes, but of aircraft generally whether of the heavier-than-air or lighter-than-air types.

An airplane is disclosed in Fig. 1 having a fuselage 10 embodying, and constructed and arranged in accordance with, the invention hereof. The airplane, in the particular example hereof, is of the commercial or transport type and includes the monoplane wing 11 disposed above and across fuselage 10, the empennage 12, landing gear 14, and motor M at the forward or nose end of fuselage 10, driving the tractor propeller P. The invention is of course not limited to this general type and arrangement of airplane, or to the use of a monoplane wing, or the particular mounting and relative arrangement thereof as shown. If desired with the airplane type selected for purposes of illustration, a lower wing 15, indicated in dotted outline, can be employed to provide a multiplane wing arrangement, the invention residing primarily, though not solely, in the fuselage construction and arrangement, and not to the particular type of aircraft with which used and in which incorporated.

The body or fuselage 10, is in the present instance of the enclosed or cabin type, and comprises and consists of the forward or motor section A, the intermediate cabin or useful load section B, and the rear or tail section C. Following the principles of the invention, the cabin or useful load section B of fuselage 10 is of the monocoque or semi-monocoque type of constructon, while the forward or motor section A, and the rear section C are both of the "trussed" type of construction.

The useful load or cabin section B, referring now particularly to Figs. 2 and 3, embodies a monocoque or shell-like construction which comprises the spaced upper and lower longitudinals or longérons 23 and 24, and a series of transverse frames or formers 20, spaced apart longitudinally of the section and longérons, each of said formers consisting of the opposite vertical members 21 and the opposite horizontal upper and lower members 22, all connected at their opposite ends to and extending between the longitudinals or longérons 23 and 24, respectively, to form, in the present instance, a rectangular frame or former. With the cabin section framework so formed, in accordance with the monocoque type of construction, the fuselage section B is completed by the application to and over the framework of a skin or covering 25, which is secured thereto and forms a part of the load and stress carrying structure giving added strength to the section, and eliminating in the usual instance the necessity for cross bracing between the formers 20 and longérons 23 and 24. The skin or covering 25, in the example hereof, is formed of suitable corrugated sheet metal, having the required characteristics and qualities, and is applied over and to the formers 20 and longérons 23 and 24 with the corrugations disposed longitudinally of the section in a direction fore and aft of fuselage 10. While metal is here disclosed as the skin or covering in the monocoque construction of the fuselage section B, the invention is not restricted to such material, as other materials having the requisite characteristics to form the strengthening and bracing function for load and stress carrying duties can be employed.

With the mounting of the wing 11, in the particular type and design of airplane here shown, such wing extends over and across the cabin section B and is utilized to form the closure or top covering for this section, thus eliminating the covering of the upper or top side of the section with the skin 25, the wing 11 acting to brace and strengthen the section at and across the upper side thereof, as will be clear by reference to the drawings. However, if desired, skin 25 can be provided covering the upper side of section B, with wing 11 secured over such upper covering. Of course, where other wing mountings than that shown are utilized, as for example a mounting below the upper side of the cabin section B, then such upper side, in the case of the cabin or enclosed type of fuselage is covered by such load and stress carrying skin 25.

The cabin or useful load section B of fuselage 10, by the monocoque or shell-like type of construction employed, as defined and described hereinbefore, is interiorly unobstructed to give a clear passenger or cargo space, and where forward and rear closing walls 26 are provided by the use of the skin 25 extended over and across the forward and rear ends, as shown by Fig. 2 of the drawings, the section B is given substantial fire and crash protection by such walls which in and of themselves form in effect bulkheads closing off the cabin section. Such end walls or bulkheads 26 are not essential to the cabin section of the invention, and may if desired be eliminated, or only provided at one end of the section, for example the forward end, to form a fire wall separating the cabin section from the forward motor section A. Where a wall 26 is mounted at the rear end of section B, if desired a suitable opening, door closed or not as found expedient, (not shown) may be provided through which access to the cabin section B may be had.

The monocoque construction of section B simplifies the mounting of windows in the section side walls 25, such as windows 27 in the forms shown in the accompanying drawings, because of the frame former arrangement giving window space substantially unobstructed by trussing, bracing and such like structure. The construction used also renders the use of sliding or drop type window frames feasible, particularly where such frames are of a width to fit between formers 20 of the section B construction.

The insulation of the cabin or useful load section B against noise, vibration, drafts or air leakage, forms a feature of the invention, and is rendered simple, practical and relatively inexpensive by the monocoque type of body construction. With the form of cabin section B here shown, an inner wall or lining and suitable material 28, referring now to Figs. 2 and 3 of the drawings, is provided secured over and across the formers 20 to cover the sides, top, and bottom of the interior of cabin section B. The inner wall 28 is thus spaced by the formers 20 from the outer, stress carrying skin or covering 25, and the space between these walls is filled or stuffed with any suitable insulating material 29 (see Fig. 3). In such manner a double wall construction is provided for the cabin section, with the insulating material 29 therebetween effectively sealing the section against noise, odors, air leakage and the like. Such double wall and insulation can if desired be applied to the end wall or walls 26, and the invention so contemplates. In addition, the wall construction and arrangement of the cabin section insures adequate cargo retaining surfaces against which cargo can be more efficiently stowed within the section B.

The cabin or useful load sections B are preferably of monocoque construction, but may also be of the so-called semi-monocoque construction, as illustrated by Fig. 4 of the accompanying drawings, in which the diagonal bracing 20' is provided in the frame construction across formers 20 and between upper and lower longérons 23 and 24. In the semi-monocoque construction, the skin or covering 25 forms a part of and adds strength to the complete stress carrying structure, as previously explained.

The forward motor section A and the rear or after section C, forming with the monocoque intermediate section B the complete fuselage 10, are of the trussed type of body construction in which a trussed frame is covered by a skin or covering which does not itself carry any loads or stresses but is purely a covering or fairing for the trussed frame. The forward or motor section A comprises a trussed frame of more or less conventional construction consisting of upper and lower longérons 30 connected by struts or braces 31, and with the diagonal brace wires 32 extending across and between the longérons 30 and struts 31, as will be clear by reference to Fig. 1. Over the trussed frame so formed a covering or skin 33 of suitable material, such as fabric, is secured, although in the case of this forward section A in particular, the invention contemplates and includes the use of a metal covering to provide a cowling for this motor section A. The rear or after section C is of the same type of trussed construction as forward section A, and includes the trussed frame consisting of upper and lower longérons 40, struts or braces 41, and wire bracing 42, with the skin or covering 43 thereover to fair and enclose the same. The section C mounts the tail assembly or empennage 12 at its rear end in the usual manner, and in the example hereof is provided at its forward end with a suitable opening having a door 44 therein adjacent section B through which access may be had through the forward end of section C to the interior of cabin section B, as clearly shown by Figs. 1 and 4.

The fuselage sections A and C are so designed and constructed as to be attached to the forward and rear ends of intermediate cabin or useful load section B respectively, with such sections forming forward and rearward continuations and carrying out the contour of intermediate section to form therewith the complete fuselage 10. The longérons 30 of forward section A in mounted position of such section on section B aline with the foward ends of longérons 23 and 24, respectively, of section B, while the forward ends of section C longérons 40 aline with the after ends of section B longérons 23 and 24, respectively, with section C in mounted position on the cabin section B. Preferably, the invention provides for the detachable connection and assembly of fuselage sections A, B, and C. In the particular example hereof, suitable detachable couplings or joints 45 are provided for detachably connecting and securing the section longérons together with the sections in fuselage forming position and relation. Such detachable couplings or joints may take any desired form or type, such for example as the couplings shown in Figs. 9 and 10 hereinafter described, or couplings of the pin type well known in this art. By providing for the detachable coupling and connection of the fuselage sections A, B, and C, facility of assembly is obtained, together with ease of disassembly for inspection, repair, or replacement.

The formation of the monocoque cabin or useful load section of the fuselage of standardized units is a further feature of the invention, and one mechanical and aerodynamic embodiment of such feature is disclosed by way of example in Fig. 5 of the accompanying drawings, in which the monocoque cabin section B' is formed of the detachable units D and the series of units E. The forward unit D, in this instance, although the invention is not so limited, is formed to carry out the forward taper or streamline contour of the fuselage, while the after units E, are each identical in dimensions, and in design and arrangement, as will be clear by reference to Fig. 5. The construction of the unit D and the units E, is of the monocoque type identical with that described in connection with Figs. 1, 2 and 3, including longérons 23 and 24, transverse formers 20, and load carrying skin 25. These units are connected together end to end through the medium of their alined longérons, and with the standardized units E form the complete monocoque cabin or useful load section B' of the fuselage 10, which section B' with the forward and rear trussed sections A and C provide the complete fuselage.

Through the use of such standardized units E, a cabin or useful load section of the desired size and capacity can be built up by adding or including the necessary number of such units to the forward unit D. Attention is here directed to the fact that the use of a different forward unit D is not essential, as if desired the entire section B' can be built up from identical standardized units, such as E. By stocking such standard units material savings in production costs are secured, as the cabin or useful load section of a fuselage can be readily built up therefrom to the desired size and capacity. With the same design of airplane, to increase the cabin section B' size and capacity would generally call for greater power, i. e., greater motor weight forward which would tend to compensate for the added after weight and thus maintain the longitudinal balance of the design, or the increase in after fuselage weight can be readily compensated for in other ways to maintain proper weight distribution and longitudinal balance.

Provision is preferably made for detachably coupling and connecting the cabin section units D and E, through detachable couplings 46 between and connecting the alined longérons of the cabin section units. One possible type of detachable coupling is shown in Figs. 9 and 10, and comprises end plates 47 on the adjacent longéron ends, which plates abut in assembled positions of the units and are then detachably secured together by bolts or the like 48, through the abutting plates 47.

The frames of the fuselage 10, whether for the monocoque cabin section or for the trussed sections, are preferably formed of metal tubes, cylindrical in cross section for well known reasons of strength, with the joints between tubes formed by welding. The present invention provides an improved welded joint and method of forming the same which are of general application to aircraft frame construction. In Figs. 6, 7, and 8, of the accompanying drawings, welded joints of the invention, formed in accordance with the method thereof, are shown as examples. Referring now to Fig. 6, a cylindrical tube member 50 is shown, to which it is desired to weld several tube members 51 and 52. In the first step of the invention the tube 50 is flattened locally to provide the flat surfaces or walls 53 and 54, at the points where the ends of tubes 51 and 52, respectively, are to be joined and welded to tube 50. The ends of tubes 51 and 52, which are to be joined to tube 50, are then cut off transversely at the desired angle, dependent upon the angle, respectively, at which they are to extend from the tube 50 in joined, secured position thereto and thereon. After tubes 51 and 52 are cut off, they are held in desired position with their ends on and against the flat walls 53 and 54, respectively and suitably welded thereto, to form the welded joints 55 therewith. By the foregoing method a simple welded tube joint is provided of adequate strength, in which the abutment of tubes upon a flat surface requires less fitting than the abutment upon a curved surface and the cylindrical cross section in the tube to which the abutting tube ends are welded, is retained except locally at the point of jointure, where the cylindrical section is flattened.

In a modified joint formed by the method of the invention and shown in Fig. 7, the tube 50 is squared or given a rectangular cross section at the location of the joint, to provide opposite flat walls 57 to which the ends of tubes 56 are welded, respectively, to result in a welded tube joint of the invention. Obviously other designs and arrangements of joints may be formed by the method of the invention than those here shown as examples, and the invention contemplates and includes such other joints.

By the fuselage or body design, arrangement and construction embodying the use of sections of monocoque construction with sections of trussed construction, the hereinbefore referred to material advantages and results are secured, all with reduction in construction and assembly costs with increased speed of production, as well as a body or fuselage of greater efficiency in use. The term "monocoque" as used herein and in the appended claims covers and includes "semi-monocoque" construction, as well as any type of construction in which the skin or covering on a frame structure itself carries loads and stresses and adds strength to the total structure; while the term "trussed" construction as used herein and in the appended claims includes and covers any frame structure which alone or in itself carries the loads and stresses, and which if having a skin or covering, the latter carries no loads or stresses and adds no strength thereto, although it is to be clearly understood that under "trussed" construction no skin or covering need be included.

Attention is further directed to the fact that the monocoque section B can be continued forwardly with the elimination of the forward truss section A, and the formation of a single forward monocoque section B, with the rear trussed section C to form the complete fuselage, and the invention includes such construction and arrangement.

No claim is herein made to the joint or the method of forming the same as disclosed in Figs. 6 to 10 inclusive and described and explained herein, as such joint and the method of forming the same are disclosed and claimed in my pending application Serial No. 373,651 filed June 25, 1929, as a division of the present application.

It is also evident that various changes, modifications, additions, substitutions, eliminations, and variations might be resorted to without departing from the spirit and scope of my invention, and hence I do not desire to limit myself to the exact and specific disclosures hereof.

What I claim, is:

1. The combination in an aircraft body of the enclosed cabin type, of a box-like unit of monocoque construction forming the intermediate section of the body and providing an enclosed cabin therefor, said intermediate enclosed section unit consisting of a frame and a metal skin rigidly fixed thereon to carry stresses therewith and add strength to the unit and to enclose the frame to form the closed cabin unit section therewith; with a forward and a rear section of trussed construction in forward and rearward continuation, respectively, of said intermediate enclosed cabin section so as to form the complete body therewith, said forward and rear trussed sections having an unstressed and non-load carrying covering thereover in forward and rearward continuation of the stressed metal skin of the monocoque enclosed cabin section unit to carry out the contour of the body so formed.

2. An aircraft body of the enclosed cabin type comprising, an intermediate enclosed cabin forming section of monocoque construction consisting of spaced upper and lower longerons, a series of transverse formers at spaced intervals along, extending between, rigidly connected to and joining said longerons, and a corrugated metal skin over the exterior of, extending between and across and rigidly fixed to said longerons and formers to provide therewith the monocoque structure with the corrugated metal skin carrying stresses and adding strength thereto and forming therewith the enclosed cabin; a forward motor mounting and carrying section of trussed construction in forward continuation of said enclosed cabin section and consisting of longitudinal trusses comprising spaced upper and lower longérons in forward continuation of said cabin section longérons, with trussing between and rigidly connecting the longérons, and an unstressed covering over said trussed section in forward continuation of said cabin section stress carrying corrugated metal skin; and a rear section of trussed construction in rearward continuation of said enclosed cabin section, said rear section consisting of spaced upper and lower longérons in rearward continuation of the cabin section longérons, trussing between and rigidly connecting said longérons, and an unstressed covering over said rear section in continuation rearwardly of the cabin section stress carrying metal enclosing skin, the said forward, intermediate and rear sections forming the complete body having the intermediate section thereof providing the enclosed cabin of monocoque construction.

3. An aircraft body of the enclosed cabin type comprising, an intermediate enclosed cabin forming section of monocoque construction, and forward and rear sections of trussed construction detachably connected to said intermediate section in forward and rearward longitudinal continuation thereof to form therewith the complete body; said intermediate enclosed cabin section consisting of spaced upper and lower longérons, transverse formers rigidly connected to, extending between and joining said longérons, and a metal skin rigidly fixed to said longérons and formers on the exterior thereof to form the enclosed cabin with said metal skin carrying stresses and adding strength to the cabin section structure; said forward and rear sections each consisting of spaced upper and lower longérons, trussing therebetween and rigidly connecting the same, and an unstressed, non-load carrying covering over and across said longérons and trussing; and the longérons of the forward and rear sections in forward and rearward continuation of the intermediate section longérons, respectively, with the adjacent ends of the forward and rear section and intermediate section longérons detachably coupled to secure the sections in assembled relation providing the complete body having the intermediate enclosed cabin of monocoque construction.

4. The combination in an aircraft of the enclosed cabin type, of a substantially rectangular, box-like unit of monocoque construction forming the intermediate section of the body and providing a complete enclosed cabin, said enclosed cabin unit comprising spaced upper and lower longérons, transverse formers rigidly connected to, extending between and joining said longérons, and a metal skin rigidly secured to and across the exterior of said longérons and formers to enclose the same and arranged to carry stresses and add strength to the unit, said metal skin extended across and closing the forward and rear ends of said unit to provide transverse dividing and end partition walls therefor; with a forward and a rear section of trussed construction in forward and rearward continuation, respectively, of said intermediate enclosed cabin forming unit so as to form the complete body therewith, said forward and rear sections of trussed construction each having an unstressed covering thereover in forward and rearward contiuation, respectively, of the stressed metal skin of the monocoque construction of the enclosed cabin unit to carry out the contour of the body so formed, the forward and end walls of the cabin unit dividing and separating the interior thereof from the forward and rear trussed construction sections.

5. The combination in an aircraft body of the enclosed cabin type, of an intermediate enclosed cabin forming section of monocoque construction, with a forward and a rear section of trussed construction detachably connected to and in forward and rearward continuation, respectively, of said intermediate section to form therewith the complete body, the said intermediate enclosed cabin section or monocoque construction formed of a series of transverse units detachably connected together in longitudinal alinement, the length of said monocoque construction intermediate enclosed cabin forming section adjustable by removing a transverse unit therefrom or adding a unit in connected assembly therewith.

6. In an aircraft body of the enclosed cabin type, a section of monocoque construction forming an enclosed cabin for the body, said section constructed of a series of transverse units detachably coupled and connected together to form the complete section, and each of said units consisting of spaced upper and lower longérons, transverse formers therebetween and rigidly joining the same, and a metal skin secured rigidly on and covering said unit, said skin carrying stresses to add strength thereto and in assembled relation of the units combining with the skin of the adjacent units to form the complete cabin enclosing skin of the intermediate section, the said units assembled with the longérons thereof in longitudinal alinement with the longérons of adjacent units, and means detachably coupling the longérons of adjacent units together to secure the units in position forming the complete enclosed cabin section of monocoque construction.

7. An aircraft body of the enclosed cabin type comprising, spaced upper and lower longérons, an intermediate length of said longérons, defining the length of the enclosed cabin section of the body and rigidly connected to and joined by a series of substantially rectangular transverse formers spaced therealong, the said longérons forwardly and rearwardly of the transverse formers connected and rigidly joined by trussing extending therebetween, an unstressed covering over the forward and rear trussed portions of said longérons, and a metal skin rigidly fixed to, and extending over and across the intermediate length of the longérons and the transverse formers therebetween, said metal skin stressed and adding strength to the intermediate portion of the body and forming with the longérons and formers an enclosed cabin of monocoque construction in and as an intermediate portion of the body, the unstressed covering of the trussed forward and rear portions of the body forming continuations of the stressed metal skin of the enclosed cabin to carry out the contour of the body.

Signed at Ithaca, New York, this 13th day of July, 1928.

RANDOLPH F. HALL.